United States Patent [19]
Thapar et al.

[11] Patent Number: 5,694,615
[45] Date of Patent: Dec. 2, 1997

[54] STORAGE SYSTEM HAVING STORAGE UNITS INTERCONNECTED TO FORM MULTIPLE LOOPS TO PROVIDE SIMULTANEOUS ACCESS FROM MULTIPLE HOSTS

[75] Inventors: Manu Thapar, Fremont; Shenze Chen, Cupertino, both of Calif.

[73] Assignee: Hewlett Packard Company, Palo Alto, Calif.

[21] Appl. No.: 494,457

[22] Filed: Jun. 26, 1995

[51] Int. Cl.[6] .................................................. G06F 13/00
[52] U.S. Cl. .................. 395/822; 395/828; 395/851; 395/180; 395/439
[58] Field of Search ........................ 395/575, 284, 395/440, 441, 489, 493, 182.02, 822, 828, 851, 180; 359/161

[56] References Cited

U.S. PATENT DOCUMENTS

| | | | |
|---|---|---|---|
| 4,186,380 | 1/1980 | Edwin et al. | 395/182.02 |
| 4,779,189 | 10/1988 | Legvold et al. | 395/493 |
| 4,916,605 | 4/1990 | Beardsley et al. | 395/489 |
| 5,155,845 | 10/1992 | Beal et al. | 395/575 |
| 5,237,659 | 8/1993 | Takats | 395/200 |
| 5,416,921 | 5/1995 | Frey et al. | 395/575 |
| 5,459,856 | 10/1995 | Inoue | 395/440 |
| 5,471,586 | 11/1995 | Sefidvash et al. | 395/284 |
| 5,535,035 | 7/1996 | DeFoster et al. | 359/161 |
| 5,544,339 | 8/1996 | Baba | 395/441 |

FOREIGN PATENT DOCUMENTS

| | | | |
|---|---|---|---|
| 0330475 | 8/1989 | Japan | G06F 11/20 |
| WOA91 14229 | 9/1991 | WIPO | G06F 13/12 |

OTHER PUBLICATIONS

David Maliniak, "40–Mbyte/s Serial Link Poses as an Alternative to SCSI", Electronic Design, vol. 42, No. 14, Jul. 11, 1994, pp. 46–50.

Primary Examiner—Thomas C. Lee
Assistant Examiner—Le Hien Luu
Attorney, Agent, or Firm—Brian R. Short

[57] ABSTRACT

The present invention is an apparatus and method for using the dual port feature of Fibre Channel to allow multiple computer hosts to simultaneously access a cluster of memory units that are Fibre Channel arbitrated. Typical multiple host access schemes require an expensive Fibre Channel switch and do not allow simultaneous accessing. The dual port feature of Fibre Channel devices provides for fault tolerance and redundancy, but can be used for the present invention.

6 Claims, 3 Drawing Sheets

5,694,615

STORAGE SYSTEM HAVING STORAGE UNITS INTERCONNECTED TO FORM MULTIPLE LOOPS TO PROVIDE SIMULTANEOUS ACCESS FROM MULTIPLE HOSTS

FIELD OF THE INVENTION

The invention pertains to Fibre Channel arbitrated loops for connecting disk drives. More specifically, it pertains to a multiple computer host architecture that uses the dual port disk drive feature of Fibre Channel arbitrated loops to access the disk drives.

BACKGROUND

Fibre Channel is the general name of an integrated set of standards being developed by the American National Standards Institute (ANSI) which defines new protocols for flexible information transfer. The Fibre Channel Standard addresses the need for very fast transfers of large volumes of information, while at the same time relieving system manufacturers from the burden of supporting the various types of channels and networks currently focusing on niche requirements.

Fibre Channel defines an arbitrated loop topology for connecting disk drives to host computers. FIG. 1 shows a block diagram of the connections required between a host computer and a plurality of disk drives to implement the arbitrated loop topology. A host computer 102 has a Fibre Channel controller 104. The Fibre Channel controller 104 controls the disk drives 106, 108, 110, 112 by sending commands such as reads and writes to the drives. Each individual drive has a burst data access rate and a sustained data access rate. Burst rates can be as high as 100 MB/second. Sustained data access rates are much lower. By arbitrating between disk drives, the combined sustained data access rate of the plurality of drives can be as high as the peak rate of 100 MB/second.

For reliability and fault tolerance, Fibre Channel defines a dual port configuration for devices attached to an arbitrated loop. The dual port configuration effectively allows two separate Fibre Channel arbitrated loops to be connected to the same cluster of disk drives. Reliability of the cluster of disks is enhanced because if one loop fails for some reason, the other loop can help to compensate for the failure. The two separate loops may be connected to one controller of a computer host, or to two separate controllers of a single computer host.

It is desirable to be able to access a particular Fibre Channel arbitrated loop by more than one host computer. FIG. 2 shows how this is presently accomplished by using a Fibre Channel switch 201 to interface between the host computers 202, 204 and the Fibre Channel arbitrated loops 206, 208. The Fibre Channel switch and the added interfaces add costs. Another limitation of the Fibre Channel switch is that with a blocking switch only one cluster of Fibre Channel arbitrated loop disk drives may be accessed at a time.

There is a need for multiple access to Fibre Channel devices to obtain greater shared bandwidth without adding an expensive switching interface. It is also desirable that more than one computer host be able to access different disk drives of a Fibre Channel arbitrated loop disk cluster at the same time.

SUMMARY OF INVENTION

This invention provides an apparatus and a method of multiple computer host access to Fibre Channel arbitrated loops that uses the dual port feature of Fibre Channel memory storage units to achieve higher aggregate bandwidth and sharing of data. This invention accomplishes these attributes without the overhead of an expensive Fibre Channel switch. The memory storage units of this invention are generally disk drives. This invention allows two different computer hosts to access different disk drives units of a given Fibre Channel arbitrated loop disk drive cluster at the same time.

This invention includes a multi-host storage architecture comprising a plurality of hosts wherein each host has a plurality of controllers. Each one of the host controllers is connected to one of a plurality of Fibre Channel arbitrated loops. Each of the Fibre Channel loops comprises a plurality of memory storage units. Each of the memory storage units has a plurality of data transfer ports wherein each one of the data transfer ports of each memory storage unit is connected to a corresponding data transfer port of the adjacent memory storage unit within each loop.

Other aspects and advantages of the present invention will become apparent from the following detailed description, taken in conjunction with the accompanying drawings, illustrating by way of example the principles of the invention.

DETAILED DESCRIPTION

Figure 1:
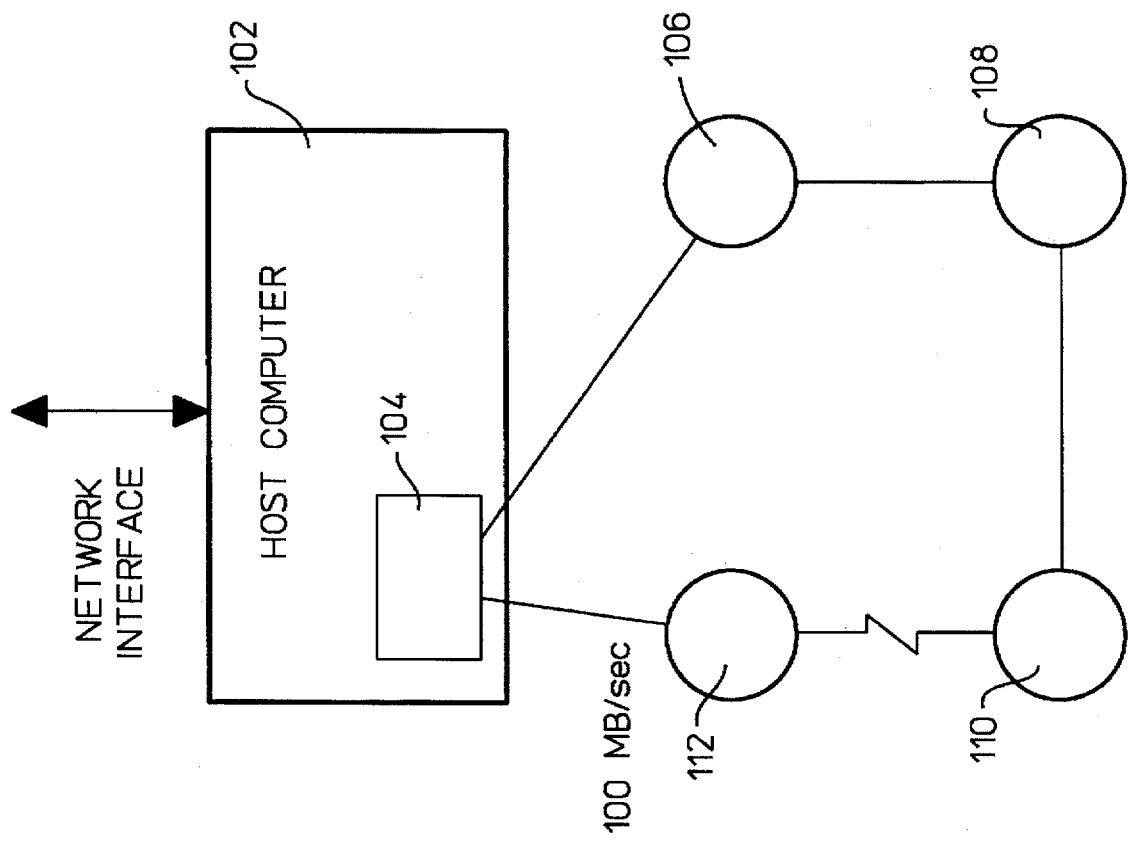
FIG. 1 shows a prior art block diagram of a host computer connected to disk drives through a standard Fibre Channel arbitrated loop.
Figure 2:
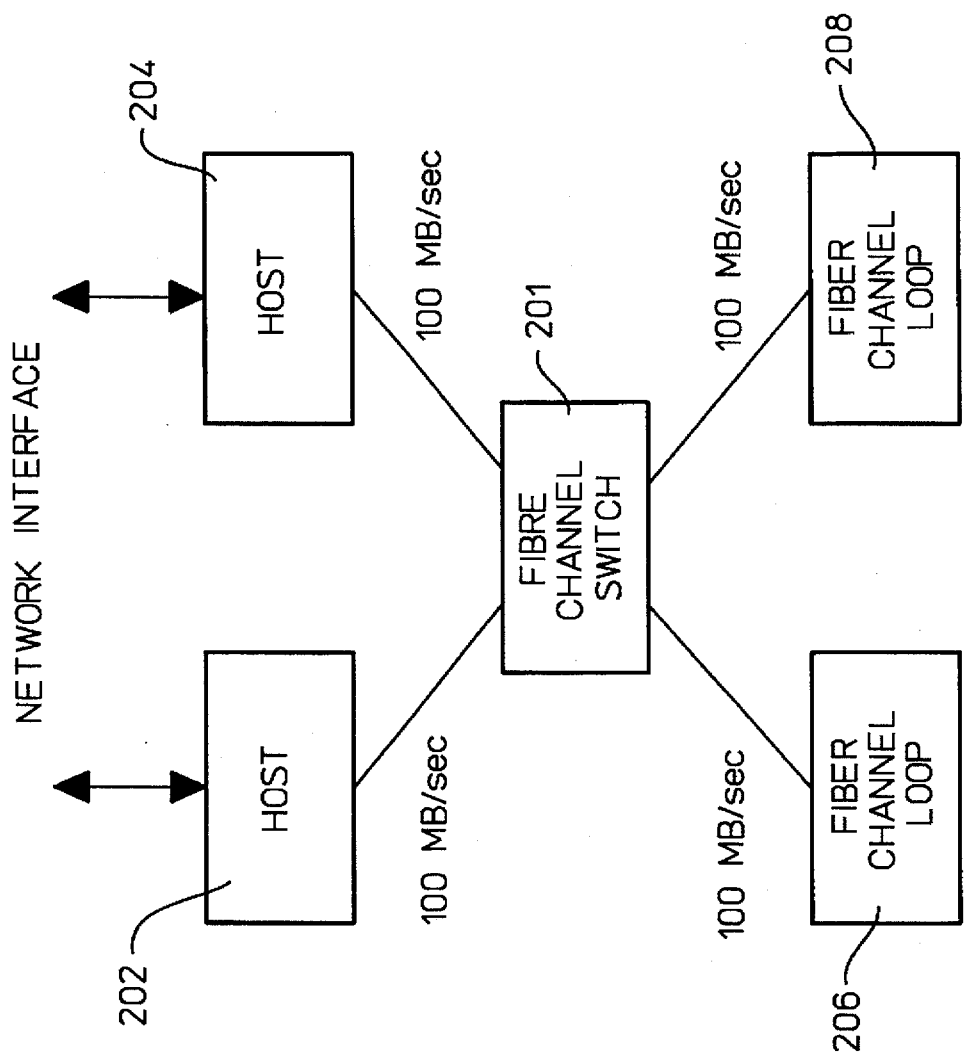
FIG. 2 shows a prior art block diagram of multiple host computers connected to disk drives through a Fibre Channel switch and multiple standard Fibre Channel arbitrated loops.

As shown in the drawings for purposes of illustration, the invention is embodied in a multiple computer host architecture wherein each host has access to a plurality of Fibre Channel arbitrated loops of memory units. The multiple host access is obtained by using the dual port feature of Fibre Channel memory storage units. With the dual ports, either of two hosts may access any given memory unit contained within either of two separate Fibre Channel loops. By increasing the number of ports, the number of hosts that can access the memory unit will increase. Increasing the number of ports also increases the number of Fiber Channel loops that a memory unit can be contained within. The architecture also allows various ones of the multiple hosts to access different memory units of a single arbitrated loop at the same time.

Figure 3:
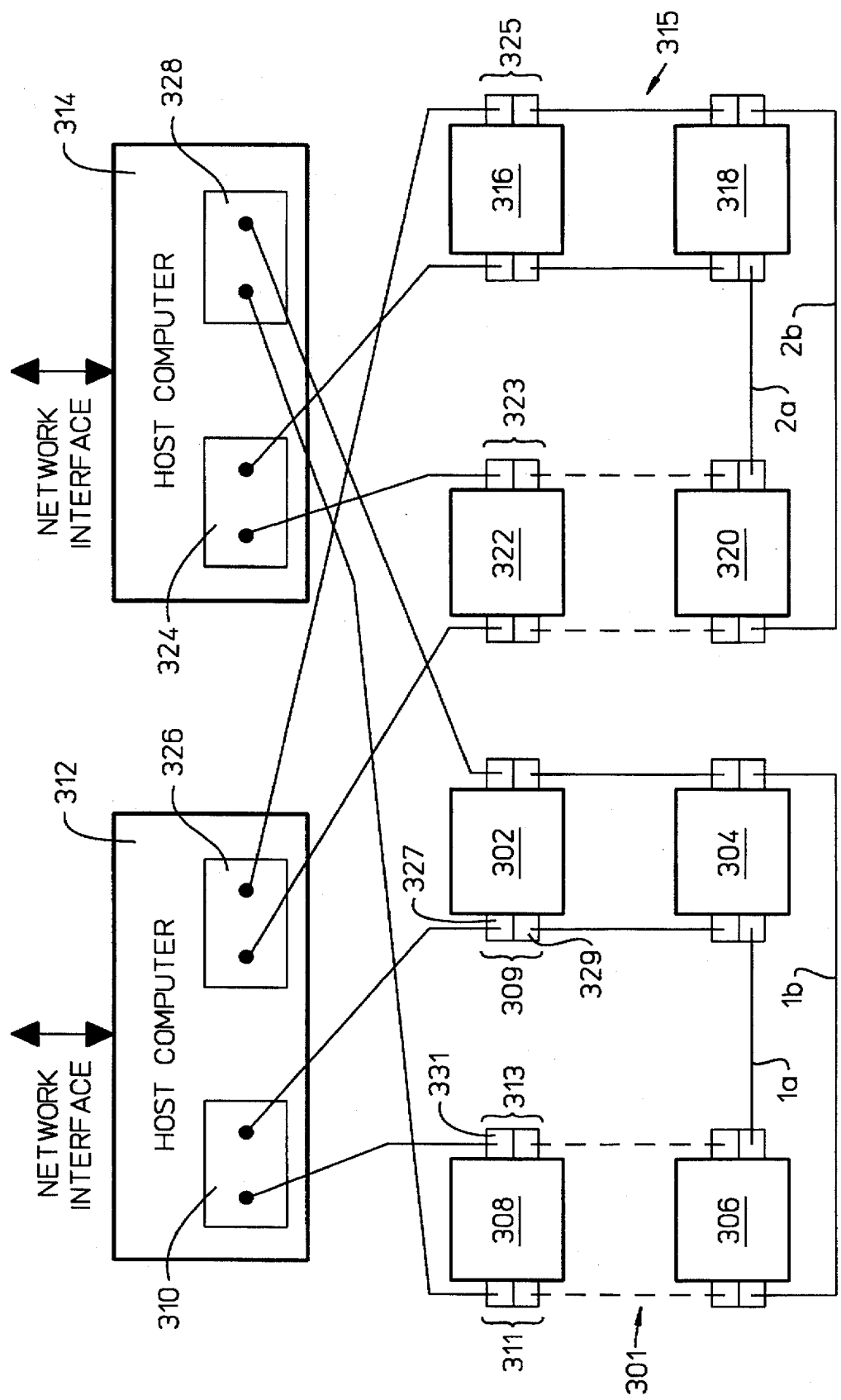
FIG. 3 shows a block diagram of the multiple host computer connection to disk drives through multiple standard arbitrated loops as described by this invention.

FIG. 3 shows a block diagram of a preferred embodiment of the invention. The invention allows more than one computer host to access a particular Fibre Channel arbitrated loop of disk drives without a Fibre Channel switch.

As shown in FIG. 3, a first cluster 301 of memory storage units is formed by a plurality of disk drives 302, 304, 306, 308. For this particular embodiment, the first cluster of memory storage units are connected to two Fibre Channel arbitrated loops. Fibre Channel arbitrated loop 1a is formed by connecting a first data transfer port 309 of each of the drives 302, 304, 306, 308 to a first controller 310 of a first host computer 312. The other Fibre Channel arbitrated loop 1b is formed by connecting a second data transfer port 311 of each of the drives 302, 304, 306, 308 to a second controller 328 of a second host computer 314. This configuration allows both the first host computer 312 and the second host computer 314 to access different drives within the first memory storage unit cluster 301 of the arbitrated loops 1a, 1b at the same time.

A second cluster 315 of memory storage units is formed by a second plurality of disk drives 316, 318, 320, 322. For this particular embodiment, the second cluster of memory storage units are connected to two Fibre Channel arbitrated loops. Fibre Channel arbitrated loop 2a is formed by connecting a first data transfer port 323 of each of the drives 316, 318, 320, 322 to a second controller 326 of the first host computer 312. The other Fibre Channel arbitrated loop 2b is formed by connecting a second data transfer port 325 of each of the drives 316, 318, 320, 322 to a first controller 324 of the second host computer 314. This configuration allows both the first host computer 312 and the second host computer 314 to access different drives within the second memory storage unit cluster 315 of the arbitrated loops 2a, 2b at the same time.

FIG. 3 shows four disk drives in the first cluster 301 and the second cluster 315. However, the number of drives in the clusters 301, 315 can be increased.

The connections between the memory storage units and the controllers can be optical or electrical. If the connections are optical, then typically an optical fiber is used. If the connections are electrical, then typically a copper based cable is used. Optical fiber allows greater physical distance between connections, but is more expensive than copper. Fibre Channel specifications define the dimensions and characteristics of the cabling or fiber to be used.

The cable or fiber used is connected to the memory storage units through the data transfer ports 309, 311, 323, 325. The data transfer ports 309, 311, 323, 325 each have both an input and an output. FIG. 3 shows the input 327 and the output 329 of the first data transfer port 309 of the memory storage unit 302. A cluster of memory units are Fibre Channel arbitrated loop configured by connecting the data transfer port output of each memory unit to the data transfer port input of a neighboring memory unit to form a loop. The two memory storage units at each end of the loop are configured so that the input portion of the data transfer port of one of the memory storage units (designated the input memory storage unit) is connected to an output of a controller and the output portion of the data transfer port of the other memory storage unit (designated the output memory storage unit) is connected to the input of the same controller. For example, as shown is FIG. 3, the two memory units at the end of loop 1a are disk drives 302, 308. The output of controller 310 is connected to the input 327 of the data transfer port 309 of the input memory storage unit 302. The input of controller 310 is connected to the output 331 of the data transfer port 313 of the output memory storage unit 308. The specifics of these connections are defined by the Fibre Channel specifications. The inputs and outputs of the data transfer ports, and the dual port architecture are defined by Fibre Channel standards.

FIG. 3 depicts an embodiment of this invention wherein there are only two computer hosts accessing a particular cluster of Fibre Channel arbitrated memory units. However, this invention can be extended to include more hosts. The number of hosts that have access to a particular cluster of Fibre Channel arbitrated drives is limited by the number of data transfer ports on the memory storage units. The memory storage units shown in FIG. 3 only have two data transfer ports. The number of data transfer ports, however, can be increased. Correspondingly, the number of computer hosts able to directly access the cluster of memory units increases.

FIG. 3 depicts this invention wherein there are only two memory unit clusters connected to each computer host. However, the number of different clusters that can be accessed by a particular computer host can be increased merely by increasing the number of controllers on the computer host.

By extending the symmetric usage of the two ports, it is possible to achieve performance benefits in addition to sharing of information between hosts. When a single port of a dual port drive is active and the other port is in passive standby for fault tolerance, only one host can access a particular disk in a loop at a time. The importance of this condition can be illustrated through the following example. As shown in FIG. 1, when the computer host 102 is accessing a first disk drive 106, all of the other disk drives 108, 110, 112 are blocked from being accessed. However, as shown in FIG. 3, while accessing a first disk drive 302 with a first host 312 through loop 1a in the present invention, a second disk drive 304 can be accessed by a second host 314 simultaneously through loop 1b.

Although a specific embodiment of the invention has been described and illustrated, the invention is not to be limited to the specific forms or arrangements of parts so described and illustrated. The invention is only limited by the claims.

We claim:

1. A multi-host information storage system architecture comprising:

a first memory storage unit cluster having a plurality of memory storage units, each memory storage unit having a first data transfer port and a second data transfer port, the first data transfer ports of all the memory storage units of the first memory storage unit cluster being interconnected to form a first loop and the second data transfer ports of all the memory storage units of the first memory storage unit cluster being interconnected to form a second loop;

a second memory storage unit cluster having a plurality of memory storage units, each memory storage unit having a first data transfer port and a second data transfer port, the first data transfer ports of all the memory storage units of the second memory storage unit cluster being interconnected to form a third loop and the second data transfer ports of all the memory storage units of the second memory storage unit cluster being interconnected to form a fourth loop;

a first host having a first controller in communication with the first loop and a second controller in communication with the third loop; and a second host having a first controller in communication with the second loop and a second controller in communication with the fourth loop.

2. An architecture as in claim 1 wherein:

the first data transfer port of each of the memory storage units in the first memory storage unit cluster has an input and an output;

the input of the first data port of one of the memory storage units is in communication with an output of the first controller of the first host;

the output of the first data port of another one of the memory storage units is in communication with an input of the first controller of the first host; and the remaining inputs and outputs of the first data ports are interconnected to define the first loop.

3. The multi-host architecture as recited in claim 1, wherein at least one of the loops is a Fibre Channel arbitrated loop.

4. The architecture as recited in claim 1, wherein the transfer ports are interconnected optically.

5. The architecture as recited in claim 1, wherein the transfer ports are interconnected electrically.

6. The multi-host architecture as recited in claim 1, wherein the memory storage units are disk drives.

* * * * *